(12) United States Patent
Mages et al.

(10) Patent No.: US 6,463,467 B1
(45) Date of Patent: Oct. 8, 2002

(54) METHOD AND APPARATUS OF SECURE SERVER CONTROL OF LOCAL MEDIA VIA A TRIGGER THROUGH A NETWORK FOR INSTANT LOCAL ACCESS OF ENCRYPTED DATA ON AN INTERNET WEBPAGE

(75) Inventors: Kenneth G. Mages, Highland Park; Jie Feng, Evanston, both of IL (US)

(73) Assignee: HyperLOCK Technologies, Inc., Smokie, IL (US)

( * ) Notice: Subject to any disclaimer, the term of this patent is extended or adjusted under 35 U.S.C. 154(b) by 0 days.

(21) Appl. No.: 09/439,859

(22) Filed: Nov. 12, 1999

Related U.S. Application Data

(63) Continuation of application No. 08/872,082, filed on Jun. 10, 1997, now Pat. No. 6,185,306, and a continuation-in-part of application No. 08/792,092, filed on Jan. 31, 1997, now Pat. No. 5,937,164, and a continuation-in-part of application No. 08/756,162, filed on Nov. 25, 1996, now Pat. No. 5,892,825, which is a continuation-in-part of application No. 08/568,631, filed on Dec. 7, 1995, now abandoned.

(51) Int. Cl.$^7$ ............................................. G06F 12/14
(52) U.S. Cl. ...................... 709/218; 380/279; 713/200; 713/201
(58) Field of Search ................................. 709/218, 203, 709/229; 380/279, 277; 710/10; 705/51, 57; 713/200, 201

(56) References Cited

U.S. PATENT DOCUMENTS

| | | | | | |
|---|---|---|---|---|---|
| 4,685,055 A | * | 8/1987 | Thomas | ............................ | 380/4 |
| 5,103,476 A | * | 4/1992 | Waite et al. | ..................... | 380/4 |
| 5,222,134 A | * | 6/1993 | Waite et al. | ..................... | 380/4 |
| 5,509,070 A | * | 4/1996 | Schull | ............................ | 380/4 |
| 5,548,645 A | * | 8/1996 | Ananda | ........................... | 380/4 |
| 5,790,664 A | * | 8/1998 | Coley et al. | .................... | 380/4 |
| 5,892,825 A | * | 4/1999 | Mages et al. | .................. | 380/3 |
| 5,937,164 A | * | 8/1999 | Mages et al. | ................ | 709/218 |
| 6,185,306 B1 | * | 2/2001 | Mages et al. | ................ | 380/203 |

* cited by examiner

Primary Examiner—James P. Trammell
Assistant Examiner—Pierre E. Elisca
(74) Attorney, Agent, or Firm—Darby & Darby

(57) ABSTRACT

A method of transmitting protected video and/or graphic data over the Internet from a Web site, by encrypting the video and/or graphic data and storing it at a Web site associated with a server, and by encrypting a video player and storing it at the Web site. Both are then downloaded to a requesting computer via the Internet or Intranet. The requesting computer decrypts the video and/or graphic data and video player via a previously supplied decryption key, so that the video may be played back by the decrypted player.

10 Claims, 10 Drawing Sheets

METHOD AND APPARATUS OF SECURE SERVER CONTROL OF LOCAL MEDIA VIA A TRIGGER THROUGH A NETWORK FOR INSTANT LOCAL ACCESS OF ENCRYPTED DATA ON AN INTERNET WEBPAGE

CROSS REFERENCE TO RELATED APPLICATION

The present application is a continuation of application Ser. No. 08/872,082, filed Jun. 10, 1999, now U.S. Pat. No. 6,185,306, and is a continuation-in-part of application Ser. No. 08/792,092, filed on Jan. 31, 1997, now U.S. Pat. No. 5,937,164, which is a continuation-in-part of application Ser. No. 08/568,631, filed on Dec. 7, 1995, now abandoned and a continuation-in-part of application Ser. No. 08/756,162, filed on Nov. 25, 1996, now U.S. Pat. No. 5,892,825.

COMPUTER PROGRAM LISTING

A CD-ROM containing a computer program listing appendix has been submitted and is herein incorporated by reference. The CD-ROM contains a single ASCII text file named "KGM-JF.txt", (IBM-PC compatibility) created on Dec. 17, 2001, 363 KB in size.

A portion of the disclosure of this patent document contains material which is subject to copyright protection. The copyright owner has no objection to facsimile reproduction by anyone of the patent document or the patent disclosure, as it appears in the Patent & Trademark Office patent file or records, but otherwise reserves all copyright rights whatsoever.

BACKGROUND OF THE INVENTION

The present invention is directed to a method of transmitting "triggering data" over a network to cause video and/or audio information data on a Internet Web Page The Internet is a conglomeration of computer networks that are linked together. Each network of the Internet may have one or more servers, and an operating system that may be different from that of others in the Internet. To link one network to another, and in order to overcome these operating differences between computer networks, the Internet system utilizes hardware and software devices called: bridges, routers, and gateways, all of which adapt the information being sent on one network to the operating and protocol requirements of the receiving network. For example; a gateway will connect, or "splice" a network operating on the Novell protocol to a network that operates on a DECnet or SNA protocol.

There are currently more than 10,000 computer networks that are linked together, worldwide, which together constitute the "Internet". Because they do not all operate on the same operating system, and because of different protocols, the data sent from one host computer of one network to a receiving computer of another network—which may be many thousands of miles away from the host computer—may take a relatively long time, since the gateways, bridges and routers must conform or adapt the protocol of the sending host computer to the receiving computer's protocol.

In addition to the time-delays associated with protocol variances, the Internet when connecting to an end-user via Plain Old Telephone Service (POTS), has a maximum data-transmission capacity of 3.6 kbytes per second, which is not enough for sending video images in real time.

The Internet system utilizes two types of file-transfer protocols (FTP) for copying a file from a host computer to the receiving computer: ASCII and binary. An ASCII file is a text file, while every other kind of file is binary. ASCII files are transmitted in seven-digit ASCII codes, while the binary files are transmitted in binary code. Because all data stored in computer memory is stored in binary format, when one sends a file in the Internet, it is sent in binary format. However, as discussed above, owing to the data-transmission constraints imposed by the Internet system because of the differing operating systems, and a multitude of gateways, routers, and bridges, the file data must be sent out in packets of a size no greater than 1536 bytes. Since the size of just a thirty-second video may be as great as 2.5 megabytes, it may take up to one-half hour or more to send a thirty-second video over the Internet from a host computer to a receiving computer. Presently, there are compression techniques that compress the files in order to reduce this playback-time, which data is decompressed at the receiving computer. An example of such a system is VDOLive, manufactured by VDOnet Corp. of Santa Clara, Calif. However, these compression-systems still send the data in binary format, requiring packet-data sizes of no greater than 1536 bytes. Thus, even with these compression-systems, the length of time to receive a thirty-second video over the Internet after being buffered in the user's computer is near real time, but is unstable, choppy and drops as much as 96% of the video data over a conventional phone line.

In the Internet, there is an electronic-mail delivery system called E-mail. The E-mail system utilizes addresses to direct a message to the recipient, with each address having a mailbox code and a daemon, with the mail box and daemon being separated by the symbol @. In the E-mail delivery system, all of the messages or "mail" are routed through selected routers and gateways, until it reaches what may be called a "post office" that services the recipient to whom the electronic mail is to be delivered. The "post office" is a local server. The need for these local "post offices" is because there is every reason to assume that the recipient-computer, to which the mail is being sent, is either not powered up, or is performing a different task. Since most computers in the Internet are not multi-tasking machines, such as, for example, computers running on the DOS operating system, if such a computer be engaged in performing a task, it is not possible for it to receive the E-mail data at that time. Thus, the local "post office" or server stores the message until such a time as it may be delivered to the end-user to whom it is intended.

In the E-mail system, there has really been only one format standard for Internet messages. A variation has been the MIME version, which stands for Multipurpose Internet Mail Extensions, which defines a new header-field, which is intended for use to send non-text messages, such as multimedia messages that might include audio or images, by encoding the binary into seven-digit ASCII code. Before MIME, the limitation of E-mail systems was the fact that it would limit the contents of electronic mail messages to relatively short lines of seven-bit ASCII. This has forced users to convert any non-textual data that they may wish to send into seven-bit bytes representable as printable ASCII characters before invoking a local mail UA (User Agent, a program with which human users send and receive mail). Examples of such encodings currently used in the Internet include pure hexadecimal, uuencoded, the 3-in-4 base 64 scheme specified in RFC 1421, the Andrew Toolkit Representation [ATK], and many others. Even though a user's UA may not have the capability of dealing with the non-textual body part, the user might have some mechanism external to the UA that can extract useful information from the body part. Moreover, it does not allow for the fact that the message may eventually be gatewayed back into an X.400 message handling system (i.e., the X.400 message is "tunneled" through Internet mail), where the non-textual information would definitely become useful again. With MIME, video and/or audio data may be sent using the E-mail system. MIME uses a number of header-fields, such as "Content-Type" header field, which can be used to specify the type and subtype of data in the body of a message and to fully specify the native representation (encoding) of such data; "text" Content-Type value header field, which an be used to represent textual information in a number of character sets and formatted text description languages in a standardized manner; "multi-part" Content-Type value, which can be used to combine several body parts, possibly of differing types of data, into a single message; "application" Content-Type value, which an be used to transmit application data or binary data, and hence, among other users, to implement an electronic mail file transfer service; "message" Content-Type value, for encapsulating another mail message; "image" Content-Type value, for transmitting still image (picture) data; "audio" Content-Type value, for transmitting audio or voice data; "video" Content-Type value, for transmitting video or moving image data, possibly with audio as part of the composite video data format; "Content-Transfer-Encoding" header field, which can be used to specify an auxiliary encoding that was applied to the data in order to allow it to pass through mail transport mechanisms which may have data or character set limitations. Two additional header fields may be used to further describe the data in a message body: The "Content-ID" and "Content Description" header fields.

However, there are considerable drawbacks and deficiencies in transmitting video images and/or audio data over the Internet using E-mail's MIME. Firstly, there is often considerable time delays, such that it may take up to ten or more minutes to send a thirty-second video clip over the E-mail system. In times of high-traffic usage, the delay may even be more than ten minutes. Secondly, the video image or audio data cannot be viewed or listened to by the end-user, or recipient, until all of the data of the entire video or audio file has been received by the receiving computer, which, also, adds a considerable time lag to the actual viewing or listening. Thirdly, the end-user or recipient computer must have the necessary E-mail and MIME software for decoding the data. Fourthly, since MIME is an E-mail protocol system, the data is transmitted via the E-mail system, meaning that it is routed through one or more post offices and servers, which delay the transmission of the data, and which require that no other task be performed by the receiving computer if it is a single-tasking machine, like DOS-operating system machines. Fifthly, like all E-mail deliveries, the requisite E-mail software at the recipient computer must decode the encoded data received, and then cut-and-paste the data into a new file, such as NOTEPAD, which is time-consuming, before the new file is played back by a viewer or player.

SUMMARY OF THE INVENTION

It is the primary objective of the present invention to separate keys and data by providing a picture contained in a file or files on a Web Page accessible over the internet or intranet, having its informational data of picture, video and/or audio that is crippled, which data may only be read after it has been "uncrippled" by receiving "uncrippling" triggering data over the Internet from the end user's computer. This "key" has been provided by the Web Page via a data download after the end user has met certain requirements set by the party controlling the Web Page. The company's host computer serving the Internet may transmit the "uncrippling" data over the Internet to an end-user's receiving computer in order to uncripple and, thereby, actuate the crippled file contained on or accessable through the Web Page, so that the data thereon may be read by the end-user's receiving computer only in volatile memory such as RAM.

It is another objective of the present invention to enable server control of the access to its files by providing the end user the key to the "crippled" files accessable via the Web Page such that content by a company on the Internet may be better controlled, and whereby in conjunction with the content, video and/or audio playback may be combined with any updated, textual information, such as current price of a product or products, location of a store or stores in the vicinity of the end-user's residence, etc. Specific tracks on the CD-ROM can thereby be controlled by the remote server.

It is another objective of the present invention to provide access to such "crippled" files, whereby the end user computer is provided with Internet start-up and connecting program that automatically and directly connects the end-user's computer to the company's or content provider's host server via the Internet, whereby, not only does such facilitate and encourage the connection of the end-user to the content provider's web page, but also provides the content provider with valuable marketing information, such as the physical location of the caller, whereby selected information unique to that caller may be downloaded to him over the Internet, such as name and addresses of stores of the company or advertiser nearest to the caller, etc.

It is another objective of the present invention to provide such file imaging, with or without audio, such that the data representing the picture or video and/or audio is not accessable off the end-user's computer, without first receiving the current "key" or de-crippling triggering data from the content provider's host server (URL) being a trigger as small as a few bytes.

It is another objective of the present invention to allow by server permission only, the end-user the ability to store said trigger on non-volatile media for permanent ownership of said data.

It is also an objective of the invention to provide a software program in the end-user computer called a "catcher" for catching the trigger data such as the file header, decoding it, and playing the file header data substantially "on the fly", so that the video and/or audio data on the CD-ROM may be played back on the end-user's computer substantially immediately after having received the trigger data.

It is also an objective of the invention to store both the video files and the video player for playing the video files in encrypted form at the Web site associated with a server of the Internet or Intranet, which encrypted video files and video player are downloaded to a requesting computer having the software decryption keys for the encrypted video files and player, whereby the video files are protected from unauthorized playback or copying by screen-dumping and other such methods of capturing images.

Toward these and other ends, the method of the invention for transmitting the de-crippling triggering data for video and/or audio over the Internet consists of encoding the data representing critical information of the file keys such as the header of the picture/video/audio files accessible via the Web Page controlled by the Web Page provider, and transmitting that encoded key to a local server of the local web of the Internet serving the caller, or directly to an end-user's computer. The local server may then establishes a point-to-point socket-connection between the transmitting, host computer, and the receiving or end-user computer. When the encoded key is received by the Web Page from the End user's computer, the data is decoded and matched to the picture/video/audio files of accessable via the Web Page over the Internet, whereupon, since the data files now have an associated and complete header, the data thereof may be read, to thus allow the transmission or playback of the picture, video, or audio data on the end user's comuter.

Since the encoded header data that is sent over the Internet is a necessity before the end-user may view or playback the picture/video/audio data obtained from the Web Page, the host computer may send along with the encoded data, additional information pertinent to the information contained in the encoded transmitted files, such as current prices, special offers or deals, locations of local stores or dealers, or any information that the host computer, content provider, would like the end-user to receive.

In order to encourage the end-user to view the picture/video/audio encoded files contained and accessable via the Web Page, the downloaded software may be provided with its own Internet dial-up program files for connecting to the host web server, so that very little time and effort is required on the part of the end-user.

BRIEF DESCRIPTION OF THE DRAWINGS

The invention will be more readily understood with reference to the accompanying drawings, wherein.

DETAILED DESCRIPTION OF THE INVENTION

Figure 1:
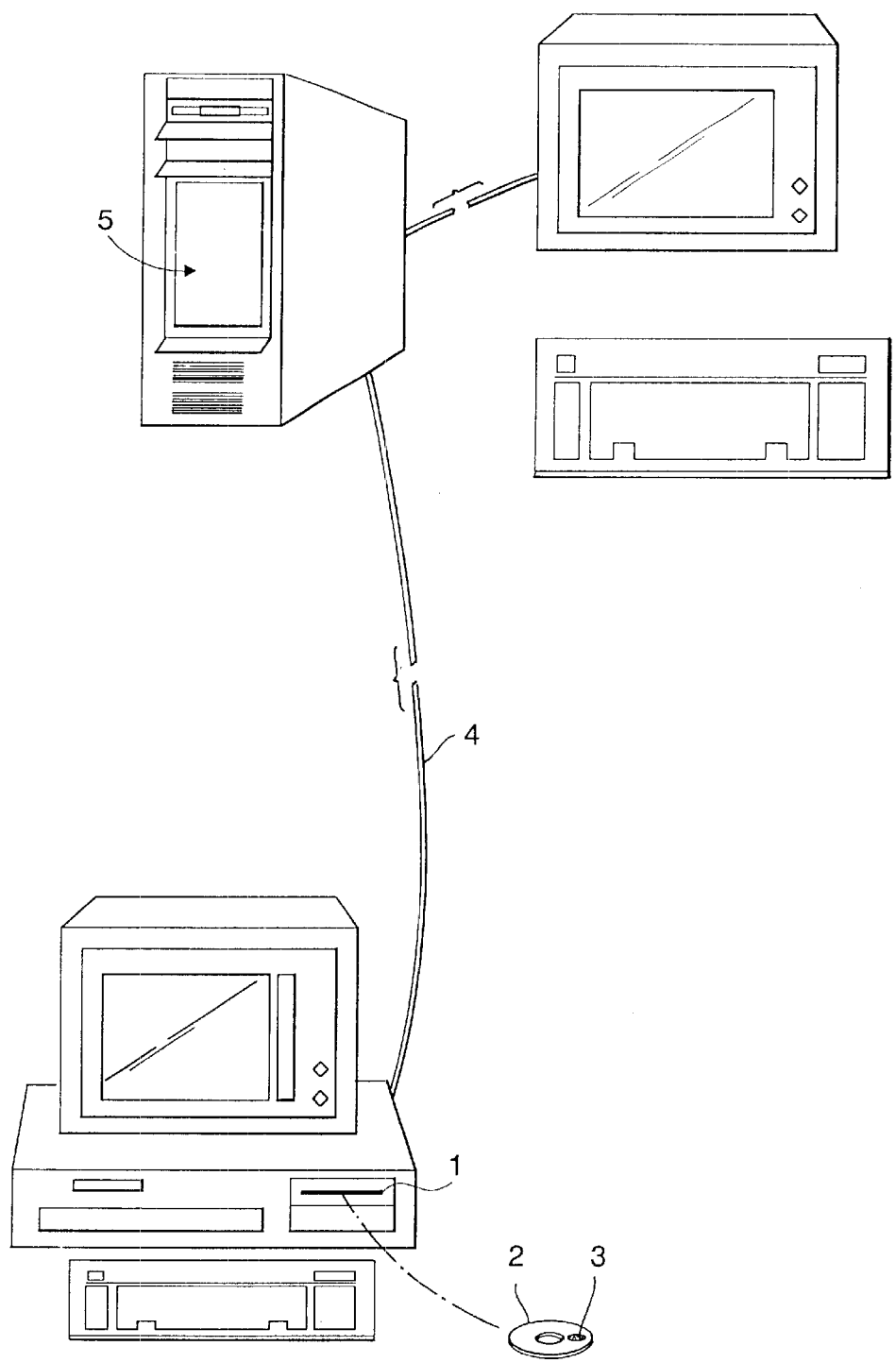
FIG. 1 is a pictorial representations of the hardware systems and software processes used for carrying out the present invention.
Figure 2:
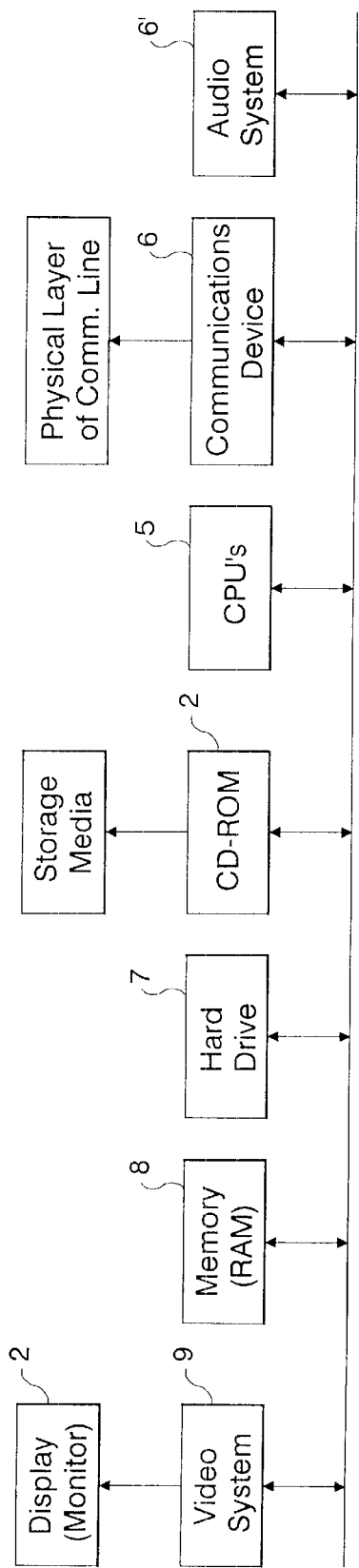
FIG. 2 is a block diagram showing the hardware of the end-user's computer used for carrying out the present invention.

Referring now to the drawings in greater detail, and to FIGS. 1 and 2 for now, the hardware used to carry out the present invention is shown. All of the hardware is conventional and well-known, and includes an end-user computer 1 having a CD-ROM drive 2 for playing a CD-ROM 3 having stored thereon crippled data 4 that is unreadable without first having received a trigger or uncrippling key 5. The end-user's computer 1 is connected via the Internet 6 to a host-computer server 7 which has stored thereat the uncrippling or triggering key 5 for the information stored on the end-user's CD-ROM 3. The end-user's computer 1 has a display and a CPU 9 and a communication-device, such as a modem 10 for establishing communication with the Internet 6. The computer 1 also has the CD-ROM drive 2, hard-drive 11, RAM 13, and video system 8 including monitor as well as audio system 13.

Figure 3:
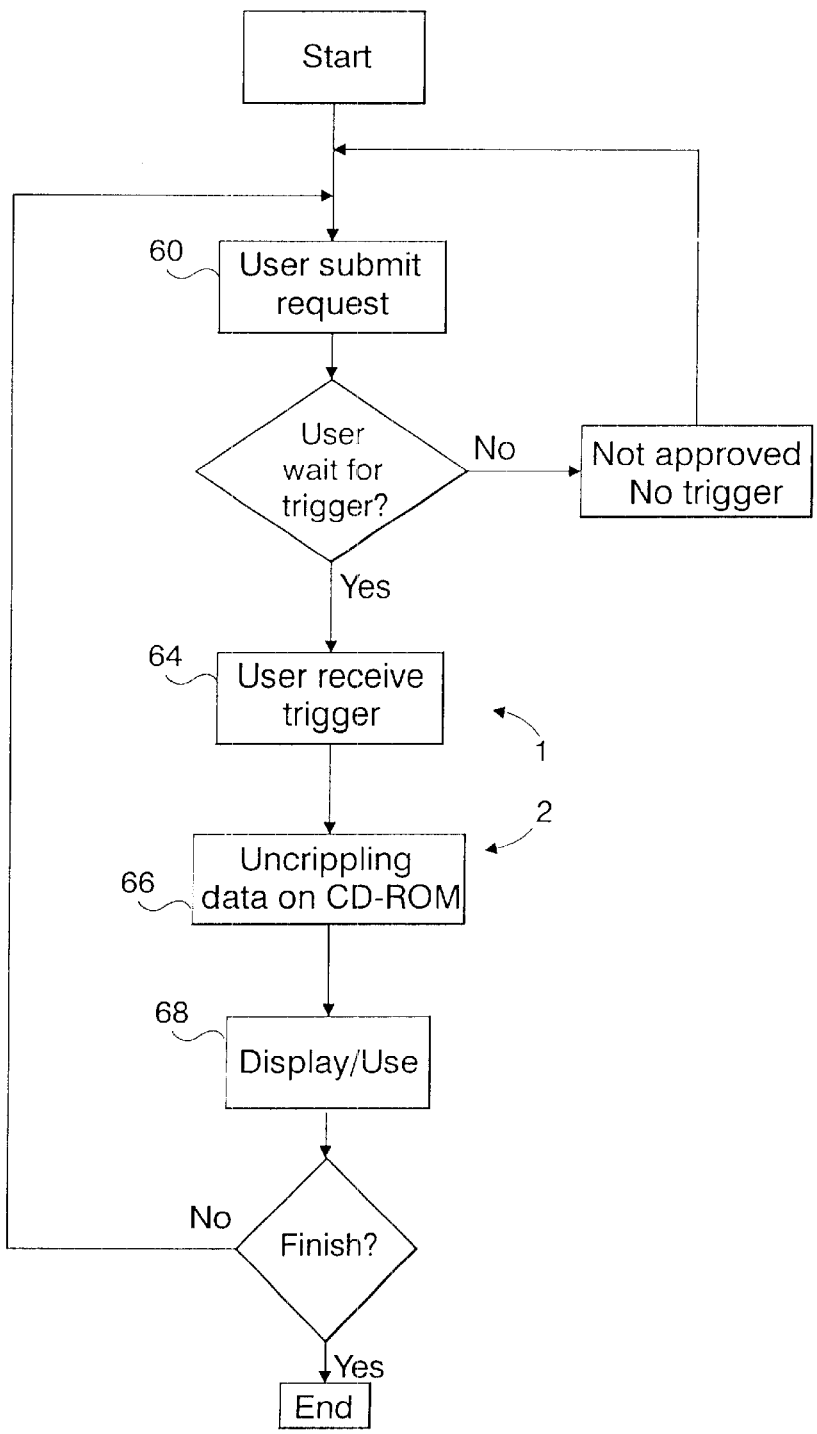
FIG. 3 is a flow chart at a user's computer for accessing the trigger-data from a web-site.

Referring to FIG. 3, there is shown the flow charts for receiving the uncrippling key. The end-user first submits a request over the Internet for the uncrippling key (block 60). The user then waits for that key (block 62), and if the user is not authorized, the request is denied. If the request is authorized, then the uncrippling key is sent by the server and received by the end-user's computer (block 64), whereupon the end-user's computer directs the uncrippling key into volatile memory such as RAM, not into a RAM-disk to be visible, but saved in a dynamically allocated data structure in RAM accessible only by the receiving program, combined with crippled data read from the CD-ROM and displays the video/animation (block 68).

Figure 4:
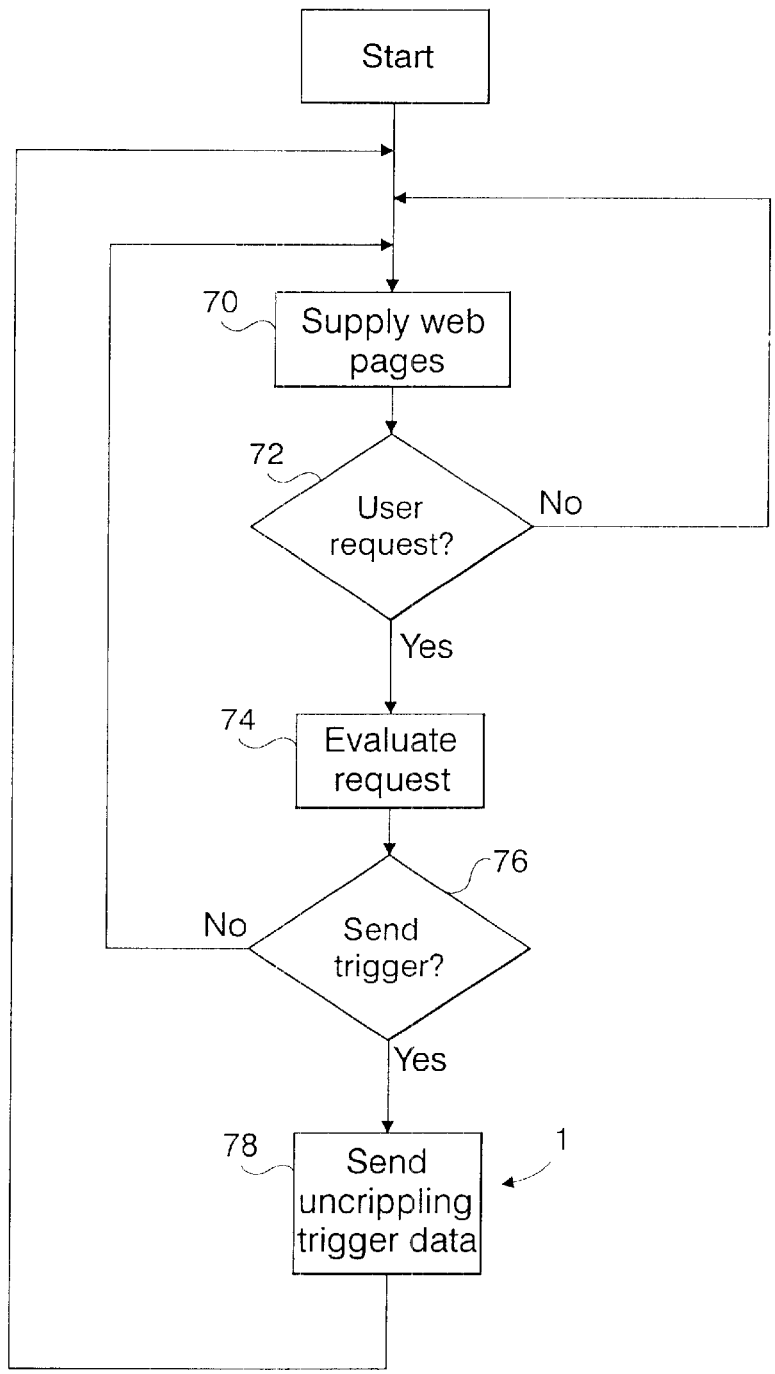
FIG. 4 is a flow chart for the server associated with the Internet for evaluating the trigger-request from the user's computer and for sending the trigger.

FIG. 4 shows the process-flow that at the server side. The server conventionally provides the web pages to the Internet users (block 70), and awaits a user-request (block 72). If a request is received from an end-user's computer, the server evaluates the request (block.74) in order to authorize the transfer of the uncrippling key (block 76). If an authorization is granted, then the uncrippling, trigger key is sent (block 78).

Figure 5:
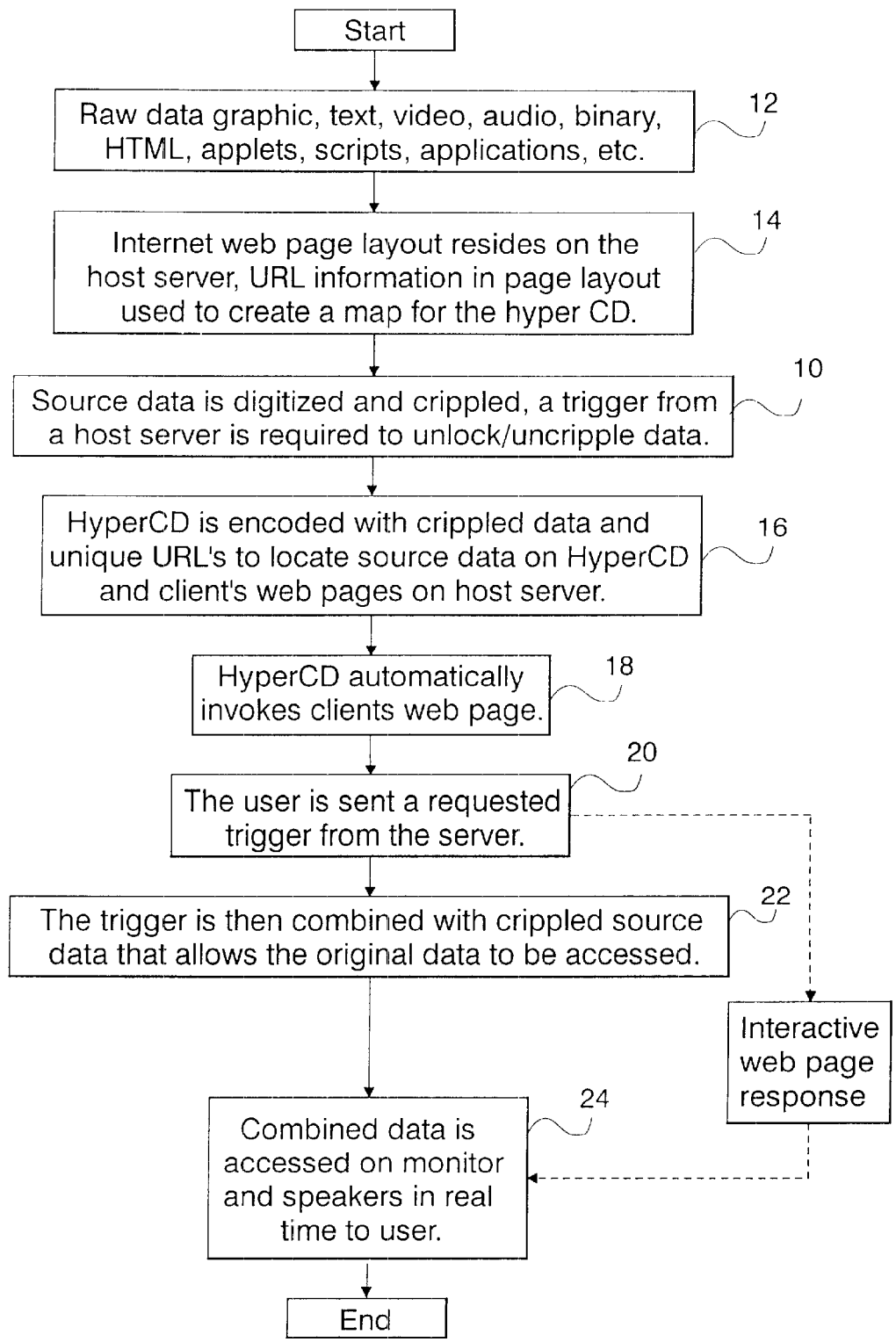
FIG. 5 is a block diagram showing the socket-to-socket connection for transmitting the de-crippling, triggering key for causing the display of the video images and/or audio data of a "HyperCD" at the end-user's PC over the Internet from a host computer combined with a targeted URL to a recipient or end-user's computer.
Figure 6:
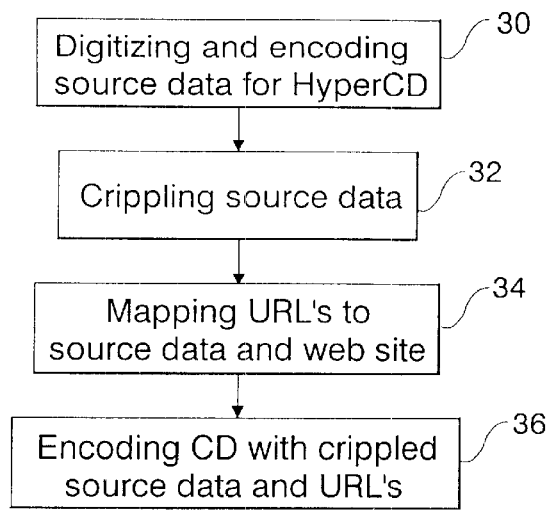
FIG. 6 is a block diagram showing the steps for forming on the CD-ROM the encoded video and audio data for use by the enduser recipient computer after having been crippled by removing the header-triggering key sent from the media files.
Figure 7:
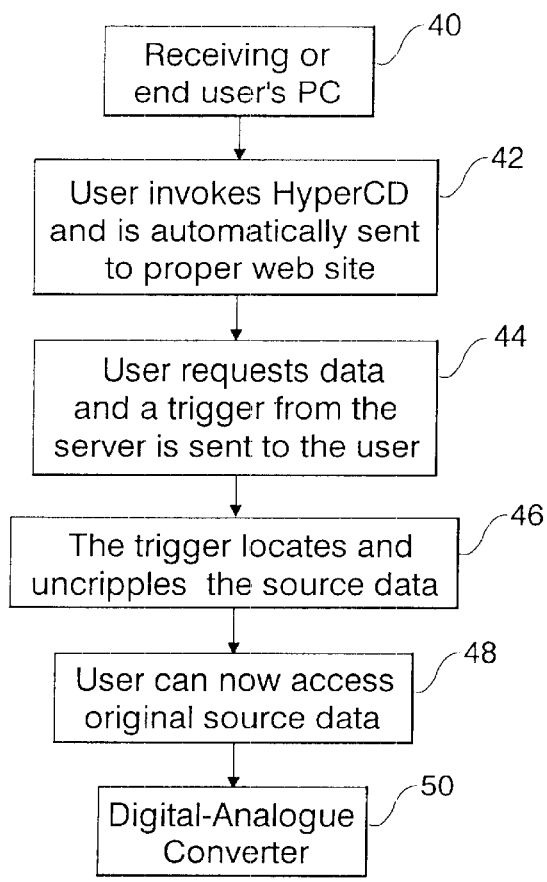
FIG. 7 is a block diagram showing the process of triggering in order to invoke "HyperCD" video and/or audio data at the receiving computer for playback.

Referring now to FIGS. 5–7, video images and/or audio are converted from analog to digital and stored in crippled fashion in digitized format (block 10) on CD-ROM 3. The crippling of the CD-ROM is achieved by removing critical information such as the video-audio header, whereupon such video/audio data is rendered unreadable by the end-user's computer. The "HyperCD" 3 is provided with the URL (web page) of the designated host computer, or server, (block 14), such, as for example: http://tekweb.com/hypercd/adver/lotto.html, which may be used on the CD-ROM for the Illinois Instant Lottery video advertising. Such digitized format may be existing computer memory files (block 12) that are already in binary format, or may be original files originated by recording the video and/or audio, as by a camcorder or tape, etc., and converting the analog signals into digital, or binary, code. In the case of originating files, the analog data may be converted to digital data using an INTEL "Smart Video Reorder Pro", for example. The raw binary data that is stored on the "HyperCD" (block 16) is crippled, so the only way to access the data is a socket-tosocket connection with the server of the web page of the host. By means of the process performed in block 14, the CD-ROM contains a code representing the URL web page of the host computer where the necessary decrippling key is located. This data on the CD-ROM 3 will automatically call up and connect the end-user's computer to the host computer's server 7 on the Internet, whereby a socket-to-socket connection is made therebetween (block 18). Such an automatic connection is well-known, and will automatically find the end-user's browser, will call the Internet service provider, and pass the necessary links from the CD-ROM to the browser in order to get to the host's web page. Such software is available on the "Windows 95" operating system, such as "ActiveX". The host computer then sends back to the local server serving the end-user's computer the necessary, uncrippling trigger for the specific video/audio data on the end-user's CD-ROM. (block 20). From the local server, the data is sent out directly over the Internet to the end-user, and, in particular, to the RAM 12 of the end-user's computer (block 22). In RAM, the trigger (block 22), and the data on the CD-ROM 3 are combined, and played back (block 24), as described above. However, as will be explained hereinbelow, since the key 5 is being sent via Internet 6, the end-user's computer 7 must be equipped with the requisite software which is capable of receiving data from the server 7 and which will ensure that the received encoded key 5 is placed safely in RAM 12, and not allowed to be otherwise saved in hard drive 11 where it may be captured and used in a way not authorized by the server 7.

Referring to FIG. 6, at the end-user computer end, the raw analog data of the audio/video is digitized (block 30), as explained above, and stored on CD-ROM 3 by conventional techniques. During the storage of the data on the key or critical information of the media file such as video-audio header associated with the video/audio files will be omitted from storage on the. CD-ROM, whereupon the CD-ROM is crippled, or prevented from being read for playing back the video/audio files (block 32). The CD-ROM is provided with software for linking up the host-computer which has the necessary key 5 for uncrippling the video-audio files 4 on the CD-ROM 3, which linking software maps or automatically directs the end-user's computer to the host server via the Internet, such linking software having all of the necessary routing information for directing the Internet connection to the host computer's server and web page (URL) (Block 34). The encoding of the critical information such as "Header" trigger is achieved utilizing any conventional encoding program, such as, for example, RSA by Data Security (block 36). This encoding will create a trigger of a few bytes comprising all of the necessary information to trigger the CD-ROM, and to invoke the video and/or audio data.

Figure 8:
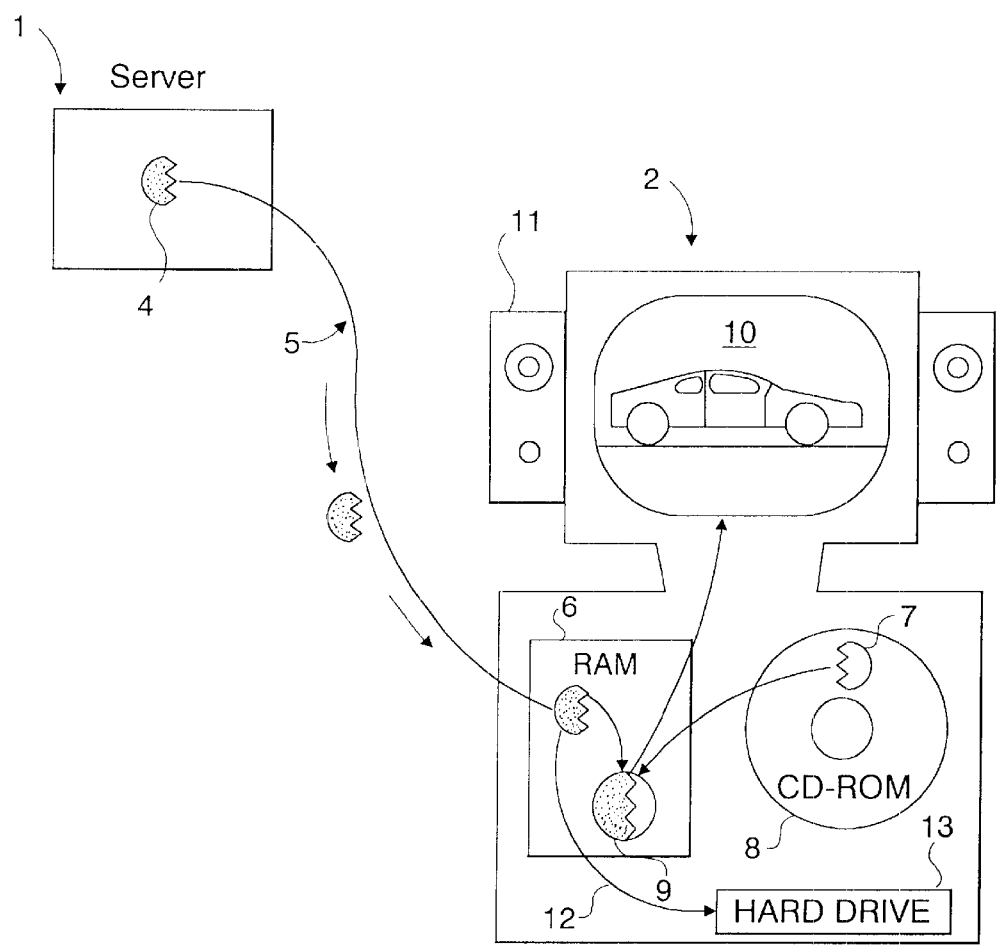
FIG. 8 is a pictorial representation of the hardware component and software processing involved.

FIG. 7 shows the steps involved for de-crippling the data on the CD-ROM 3 of a receiving or end-user's computer 1 (block 40). A socket-to-socket connection is made between the host, or sending, computer and the receiving, or end-user's computer by means of the linking software described above installed on the end-user's computer (block 42). The Internet Service Provider (ISP) of the end-user's computer's web of the Internet sends the data to the host computer's server over the Internet, which means that any number of local servers and gateways and routers will have been involved in transmitting the data, until it finally arrives at the server 7 serving the web associated with the host computer (block 42). As soon as this socket-to-socket connection is made, the encoded trigger 5 is sent, at a rate of about 3.6 kbytes a second (block 44). The end-user's computer has a specially-dedicated software program for catching the key, decrypting the key 5 from the server and data from the CD-ROM 3, combining the key and data and playing it back. This catcher is a software program discussed hereinbelow that will direct the incoming key, such as the header, to a random location in RAM 8 such as cache directory, of the computer (block 46) and the key will only be visible to the program. The catcher is necessary, since, if it were not present, it is the "nature" of personal computers to randomly dump data which has not had a specific destination assigned to it. Thus, without the catcher, the incoming data may be strewn into a different directory and/or subdirectories, to, thus, be irretrievably lost. As soon as the encoded key 5 arrives and is stored in RAM by means of the catcher program, a subroutine "player" in the program in the receiving computer begins to decode the trigger, in order to invoke the correct track of the CD-ROM (block 48), from which the data passes to the audio/video subsystem (8,13, FIG. 2), in order to play the video or audio (block 50). It is noted, and emphasized, that as soon as the key has been decoded, the video and/or audio data is immediately "played" back by the audio/video subsystems (8,13, FIG. 2), bypassing the necessity of having to first store the key, or other trigger, on a hard drive before playback. Referring specifically to FIG. 8, there are shown the server 1, the user computer 2, and the software processes 3 used for transmitting the uncrippling key 4 over a network 5, the combining in RAM 6 of the key 4 and crippled data 7 from the CD-ROM 8, the rendering or displaying of the media data 9 such as video/audio or animation on the display 10 or from the audio system 11, and the storing of the key 4 to non-volatile media 13, such as a hard drive, for permanent ownership of the encrypted CD media.

It is noted that it is possible to "cripple" the video/audio data on the CD-ROM by other means other than deleting the header thereof. For example, the file could be made a hidden file, with the trigger data from the host computer being a command to remove the hidden status. Alternatively, the video/audio file could have a changed extension, with the trigger data from the host computer being a command to change the extension. Moreover, the crippling of the video/audio file may be achieved by the use of ZIP file, with the trigger data from the host computer being a command to UNZIP the data. It is, also, within the scope and purview of the invention to use a floppy disk for storing the crippled file, as described above, for those applications requiring less disk-memory, with the uncrippling data from the host server being sent to the floppy-disk drive via the catcher program, as described above for uncrippling the data on the floppy-disk. Of course, the crippled file may also be stored on any storage medium, such as the hard drive 11, with the uncrippling data from the host server being sent to the drive for that storage medium via the catcher program, as explained above. The uncrippling data may also be stored directly in a hard drive or EPROM so that the user has permanent access to it whenever he wishes to uncripple the file; that is, if the user wishes to permanently retain the crippled nature of the data on the CD-ROM, or floppy, he may permanently store the downloaded uncrippling data in hard drive in order to temporarily uncripple the data on the CD-ROM or floppy every time that it is used, as long as such access is authorized by the server.

Figure 9:
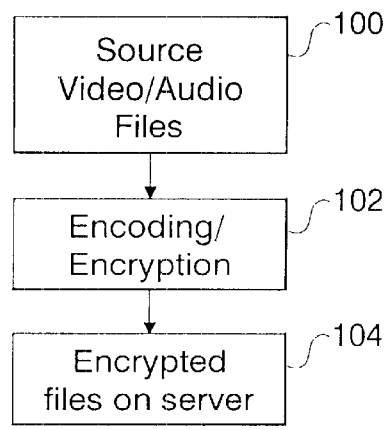
FIG. 9 is a flow chart showing the server-side of the Internet with the encrypted files thereat.
Figure 10:
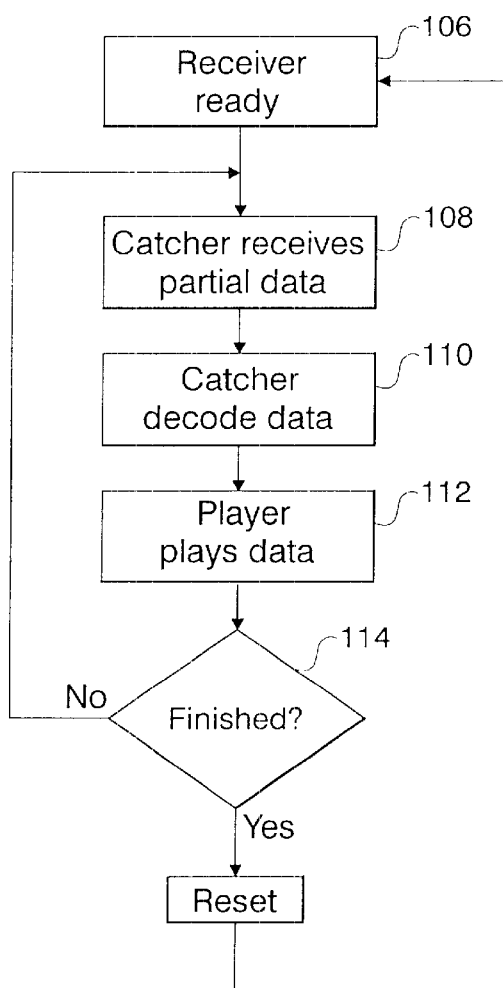
FIG. 10 is a flow chart showing the "catcher" program of the invention at the end-user's computer for playing back the receiving data immediately.
Figure 11:
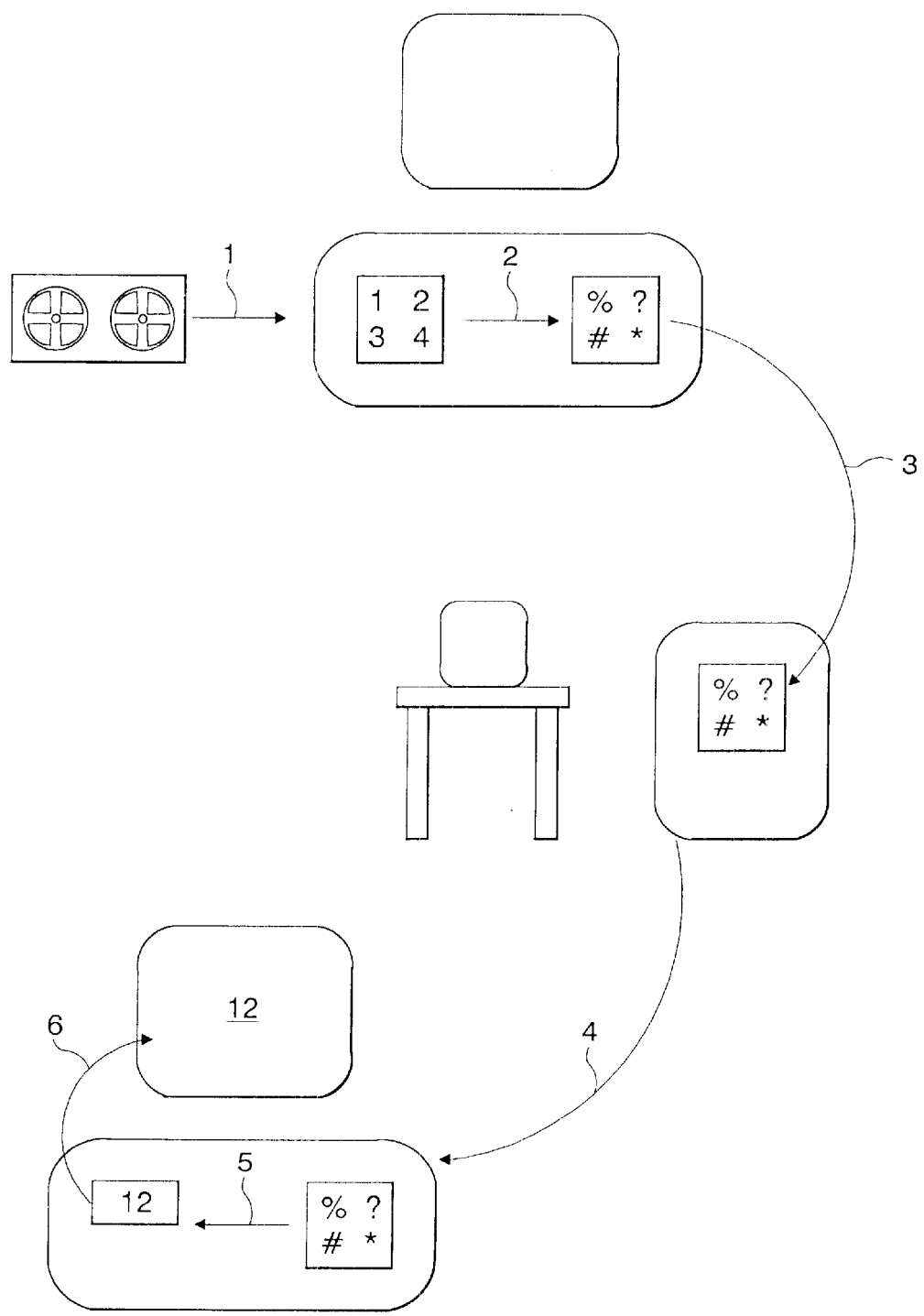
FIG. 11 is a block diagram of the catcher-program process.

Referring to FIGS. 9–11, the above-discussed "catcher" program is shown. Encrypted files, such as the header for the crippled CD-ROM data at an end-user's computer, is stored at a server associated with the Internet (block 100 in FIG. 9). This header-trigger or other file is encoded and encrypted in a conventional manner at the server (blocks 102, 104). This encoding will create a header of about 50K or less comprising all of the necessary information necessary to the video and/or audio data on the CDROM, as is well-known in the art. Then, the encoded data is sent to the local web server (block 36) in order to be sent out over the Internet, and then to the end-user computer. When the enduser computer requests that the trigger be downloaded, according to the process described above (block 106 of FIG. 10), the catcher program at the end-user computer receives the partial data or trigger, such as a header for the CD-ROM file (block 108). The catcher program decodes the data, using a conventional decoder (block 110), and then sends the data directly the conventional player of end-user computer (block 112) for substantially immediate playback. As soon as the encoded header arrives and stored in the cache directory, the program entitled "player" in the receiving computer begins to decode the data, in order to regenerate the original binary code, from which the data passes to a conventional digital-to-analog converter, in order to play the video or audio. It is noted, and emphasized, that as soon as the header has been decoded, the video and/or audio data starts to play back by the digital-to-analog converter. That is, it is not necessary to store the trigger data on a hard drive, although it is possible to do so, if it is desired to allow the end-user unobstructed access to the video or audio files on the CD-ROM, or the like, at any time in the future.

Figure 12:
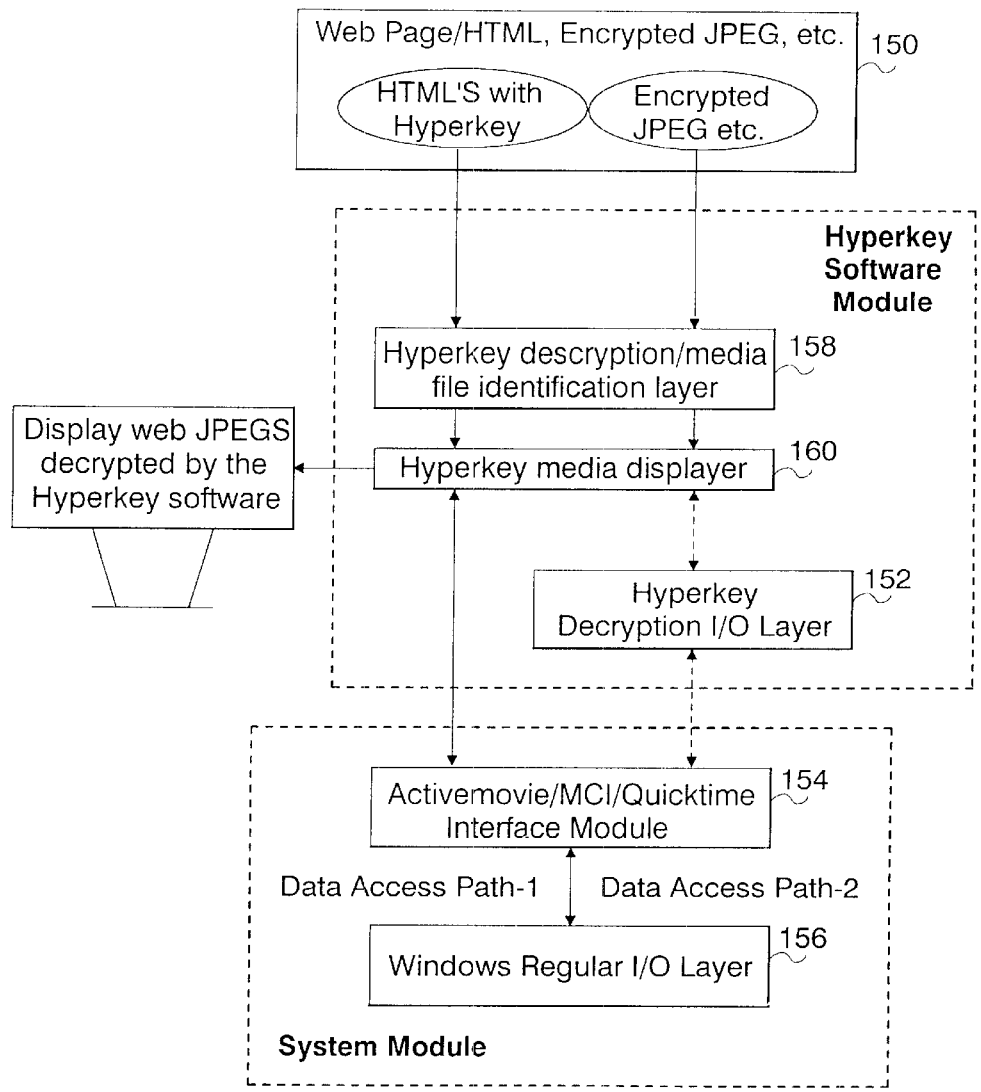
FIG. 12 is a block diagram of a modification of the invention where instead of using a CD-ROM, the video and/or other information is downloaded via the Internet from a Web page, which video and/or other information is encrypted with a key, with the user's computer storing the corresponding decryption key therefor.

Referring to FIG. 12, an alternative embodiment is shown. In this embodiment, the use of a hyperCD is obviated, and the video and/or audio, and other data, is downloaded via the Internet from a Web page (block 150). The video and/or audio, and other data, are encrypted with an encryption key. Each user who is to be able to access the data at that Web page will have a corresponding decryption key (block 152) for decrypting the data. In addition to the video or graphic or other data being sent, the Web site will also download the video player, such as JPEG, "QUICKTIME", or the like, to the user's computer via the Internet. The player, such as JPEG, is also encrypted, so that even after the end user has received the video and other data from the Web site via the Internet, the conventional player stored on the user's computer (block 154) will not be able to play the video. The data emanating from the Internet is first identified with the requesting file of the user's computer (block 158), and then sent to the media player for playback (block 160) using the encrypted player, downloaded from the Web site. The encrypted player, such as JPEG, is decrypted, like the video data, using the decryption key (block 152) provided by the provider of the Web site. It is noted that before the video is downloaded from the Web site via the Internet, the user must first enter his password or other protective feature. According to this embodiment of the invention, videos at a Web site are protected from being viewed without proper authorization, and if the downloaded video were stored in memory of the user's computer, it would not be playable without first downloading the encrypted player, such as JPEG, from the Web site. Thus, the Web provider is able to protect his video and/or graphic data from being copied by the end user's computer. Although the end user may be able to print out a graphic, this would be of very poor quality. It is also within scope and purview of the invention to download only the encrypted player, for playing back encrypted video and/or graphics already stored on the requesting, end user's computer. In this case, the video data ma be supplied to the end user in other forms besides the Internet or Intranet, but still may not be played back without use of the encrypted player downloaded from the Web site and then decrypted by the decrypting key at the end user's computer. Alternatively, the encrypted player may be provided to the end user, and only the encrypted video files may be sent over the Internet or Intranet.

The following is the software code listing for the server of the host computer's web for bursting the encoded "header" trigger data through the Internet.

---

SENDFILE.C

---

```
#!/usr/sbin/perl
# Get the input
read(STDIN, $buffer, $ENV§'CONTENT_LENGTH'†
# Split the name-value pairs
@pairs = split(/&/, $buffer);
foreach $pair (@pairs)
§
                    ($name, $value) = split(/=/, $pair);
                    # UN-Webify plus signs and %-encoding
                    $value =™ tr/+/ /;
                    $value =™ s/%([a-fA-FO-9][a-fA-FO-9]) /pack("C",hex($1)) /eg;
                    $FORM§$name† = $value;
†
# Location of the CMC files
$CMCDIR = '/UL/people/CMC/' . $FORM§'dir');
# If the $CMCDIR director is not found, exit
if( ! -d "$CMCDIR")
                    &Error("$CMCDIR not found on this system. Please check the path and try again®n");
†
# If there are no files in the CMC directory no point trying to transfer files
else
§
  opendir( THISDIR, "$CMCDIR");
  @allfiles = grep(/®.CMC/, readdir(THISDIR));
  if( ! @allfiles ) §
                    &Error("There are currenly no CMC files in this directory. Try again later."); §
  sort @allfiles;
§
print ("HTTP/1.0 200®n");
```

-continued

SENDFILE.C

```
print ("*Content-type: multipart/x-mixed-replace;boundary=- - -ThisRandomString- - -®n®n";
print ("- - -ThisRandomString- - -®n");
#Send the First file with .IVD extension which invokes IVIDEO.EXE
print "Content-type: application/x-IVD®N®N";
$CONTENT = °cat $CMCDIR/CMC001.IVD°;
print $CONTENT;
print ("®n- - -ThisRandomString- - -®n");
# Now send rest of the .CMC files which would call filehd1.exe
while (@allfiles)
{
                    $file = shift @allfiles;
                    print "Content-type: application/x-CMC®n®";
                    print $file®n";
                    $CONTENT = °cat$CMCDIR/$file°;
                    print $CONTENT;
                    print ("®n- - -ThisRandomString- - -®n");
```

We claim:

1. A method of transmitting data invoking a crippled file on a storage medium containing video and/or audio over a network, comprising:

(a) crippling the video and/or audio files on the storage medium, whereupon the files are rendered unusable without an uncrippling trigger;

(b) storing uncrippling trigger data comprising selected information at a host computer means for use in uncrippling the data files on the storage medium;

(c) transmitting the uncrippling trigger data from the host computer means through a network to the end-user's computer means with which the storage medium having the crippled data files thereon is associated;

(d) receiving the uncrippling trigger data at the end-user's computer means in the volatile RAM of the end-user's computer means; and (e) substantially instantly uncrippling the crippled data files on the storage medium by means of combining in RAM the uncrippling trigger data sent by the host computer means in said step (d) with the crippled data on the storage medium; and step (e) being carried out immediately after said step (d), and, immediately after said step (e), playing the video and/or audio on a player means;

said step (e) comprising:

1) directing the incoming uncrippling trigger data to RAM for temporary storage therein;

2) combining in RAM said uncrippling trigger data with said crippled video and/or audio files; and 3) said step of playing being performed while said uncrippling data is in said RAM for immediate playback of said video and/or audio files on said storage medium.

2. A method of transmitting data invoking a crippled file on a storage medium containing video and/or audio data over the Internet, comprising:

(a) storing uncrippling trigger data at a host computer for use in uncrippling video/audio files on a storage medium;

(b) transmitting the uncrippling trigger data from the host computer through the Internet to the end-user's computer with which the storage medium having the crippled files thereon is associated;

(c) receiving the uncrippling trigger data at the end-user's computer over the Internet;

(d) immediately after said step (c), uncrippling the crippled data files on the storage medium by means of the uncrippling trigger data sent by the host computer in said step (b);

(e) immediately after said step (d), playing the video and/or audio on a player;

said step (c) comprising directing the incoming uncrippling trigger data to volatile RAM for temporary storage therein, combining in RAM said trigger data with said crippled file;

said step (d) being performed while said uncrippling data is in said volatile RAM for immediate playback of said video and/or audio files by said step (e).

3. In a storage device, for use with a computer, which storage device comprises memory means for storing digital data thereon, the improvement comprising:

said memory means comprising crippled data files representative of video and/or audio;

an end-user's computer for use in playing back the crippled data files on the storage device;

a host computer having a memory means for storing uncrippling data comprising selected data thereon for said crippled data files on said storage device;

a network system linking said end-user's computer with said host computer, whereupon said host computer's sending said uncrippling data stored in said memory means thereof to said end-user's computer, said crippled data files on said storage device, associated with said end-user's computer is uncrippled in the RAM of the end-users's computer and rendered playable;

volatile memory means for receiving said uncrippling triggering data; means for immediately joining said uncrippling triggering data and said data files of said storage device in said RAM, for immediate playback of said data files;

said end-user's computer further comprising player means for playing back the uncrippled data files.

4. The storage device for use with a computer according to claim 3, said wherein said storage device comprises CD-ROM means.

5. A method of transmitting data invoking a crippled file on a memory-storage medium containing video and/or audio over the Internet, comprising:

(a) storing encoded uncrippling trigger data at a host computer for use in uncrippling video/audio files on a memory-storage medium;

(b) transmitting the encoded uncrippling trigger data from the host computer through the Internet to the end-user's computer with which the memory-storage medium having the crippled files thereon is associated;

(c) receiving the encoded uncrippling trigger data at the end-user's computer over the Internet; and (d) decoding the encoded uncrippling trigger data at the end-user's computer; and (e) uncrippling the crippled data files on the memory-storage medium by means of the uncrippling trigger data sent by the host computer in said step (b).

6. The method of transmitting data invoking a crippled file on a memory-storage medium containing video and/or audio over the Internet, according to claim 5, wherein before said step (a), removing the header data from the video/audio files; said step (d) comprising restoring the header data representing the header data removed from the video/audio files.

7. The method of transmitting data invoking a crippled file on a memory-storage medium containing video and/or audio over the Internet, according to claim 5, wherein after said step (e), playing the video and/or audio on a player.

8. The method of transmitting data invoking a crippled file on a memory-storage medium containing video and/or audio over the Internet, according to claim 5, wherein said step (a) comprises storing at least one of the following: Video/audio header data; data for removing the hidden-status flag for the video/audio data files on the memory-storage medium; data for unzipping the zipped data files of the video/audio data files on memory-storage medium; data for changing the extension of the video/audio data files.

9. In a memory-storage medium for use with a computer, which memory-storage medium comprises memory means for storing data thereon, the improvement comprising:

said memory means containing files representative of video and/or audio;

said files being crippled, whereby, without uncrippling trigger data, said data files are not capable of being played by a computer;

said crippled files missing necessary data that allows for the playback thereof; and separate and independently-stored uncrippling trigger data, said trigger data comprising said missing necessary data; and another memory means separate and independent from said memory means containing files representative of video and/or audio, said trigger data being stored on said another memory means.

10. A method of transmitting data invoking a crippled file on a storage medium containing video and/or audio data over a network, comprising:

(a) storing uncrippling trigger data at a host computer for use in uncrippling video/audio files on a storage medium;

(b) transmitting the uncrippling trigger data from the host computer through a network to the end-user's computer with which the storage medium having the crippled files thereon is associated;

(c) receiving the uncrippling trigger data at the end-user's computer over the network;

(d) after said step (c), uncrippling the crippled data files on the storage medium by means of the uncrippling trigger data sent by the host computer in said step (b);

(e) before said step (a), removing a necessary portion of said video/audio files without which said video/audio files are rendered unusable, said necessary portion constituting said trigger data of said step (a).

* * * * *

UNITED STATES PATENT AND TRADEMARK OFFICE
CERTIFICATE OF CORRECTION

| | | |
|---|---|---|
| PATENT NO. | : 6,463,467 B1 | |
| APPLICATION NO. | : 09/439859 | |
| DATED | : October 8, 2002 | |
| INVENTOR(S) | : Kenneth G. Mages et al. | |

It is certified that error appears in the above-identified patent and that said Letters Patent is hereby corrected as shown below:

On the first page, in field (75), in "Inventors", in column 1, line 2, delete "Evanston," and insert -- Manor Drive Wilmette --, therefor.

In column 1, line 36, after "Page" insert -- . --.

In column 1, line 47, delete "example;" and insert -- example, --, therefor.

In column 3, line 11, delete "an be" and insert -- can be --, therefor.

In column 3, line 17, delete "an be" and insert -- can be --, therefor.

In column 5, line 13, delete "comuter." and insert -- computer. --, therefor.

In column 5, line 52, delete "enduser" and insert -- end-user --, therefor.

In column 6, line 44, delete "(block.74)" and insert -- (block 74) --, therefor.

In column 7, line 17, delete "CD-ROM." and insert -- CD-ROM --, therefor.

In column 7, line 36, delete "the." and insert -- the --, therefor.

In column 9, line 3, delete "CDROM," and insert -- CD-ROM, --, therefor.

In column 9, line 6, delete "enduser" and insert -- end-user --, therefor.

In column 10, line 28, delete "ma be" and insert -- may be --, therefor.

In column 9-10, line 3, after "LENGTH'†" insert -- ); --.

Signed and Sealed this
Twenty-third Day of October, 2012

David J. Kappos
*Director of the United States Patent and Trademark Office*

In column 9-10, line 26, delete "§" and insert -- † --, therefor.

In column 9-10, line 28, delete "§" and insert -- † --, therefor.

In column 11-12, line 10, delete "†" and insert -- § --, therefor.

In column 11-12, line 12, delete "CMC®n®";" and insert -- CMC®n®n"; --, therefor.

In column 11-12, line 16, below "("®n- - -ThisRandomString- - -®n");" insert
-- †
Subroutine that tells whats wrong
sub Error
§
    print ("Content-type: texxt/html®n®n");
    print ("_Title¢Error_/Title¢®n");
    print ("_H1¢Error: _H1¢_p¢®n");
    print (@_);
    print ("_p¢_p¢_ hr¢_a href=®"mailto:cmcinter®@suba.com®"¢Contact webmaster _/a¢");
    exit ();
† --